United States Patent [19]

Dunham et al.

[11] 4,130,301

[45] Dec. 19, 1978

[54] DOUBLE-WALLED WELL CASING STRUCTURE

[75] Inventors: Harry J. Dunham, Dickinson; Gordon P. Hurd, Seabrook, both of Tex.

[73] Assignee: General Electric Company, Fairfield, Conn.

[21] Appl. No.: 860,419

[22] Filed: Dec. 13, 1977

Related U.S. Application Data

[63] Continuation of Ser. No. 544,517, Jan. 27, 1975, abandoned, which is a continuation of Ser. No. 268,337, Jul. 3, 1972, abandoned.

[51] Int. Cl.² ............................................. F16L 59/14
[52] U.S. Cl. ..................................... 285/47; 138/149; 285/336
[58] Field of Search ........... 285/47, 336, 187, DIG. 5, 285/225, 224, 9 R; 138/149

[56] References Cited

U.S. PATENT DOCUMENTS

| 2,419,278 | 4/1947 | Motsenbocker | 138/149 X |
| 2,451,146 | 10/1948 | Baker et al. | 138/149 |
| 2,860,311 | 11/1958 | Balian | 285/336 X |
| 3,275,345 | 9/1966 | Waldron et al. | 285/187 X |

OTHER PUBLICATIONS

"Double-Walled, Insulated Casing will Protect Permafrost"; Oil & Gas Journal; Jul. 26, 1971.

Primary Examiner—Thomas F. Callaghan
Attorney, Agent, or Firm—Raymond H. Quist; Allen E. Amgott

[57] ABSTRACT

A double-walled well casing for use in containing a fluid which is hotter than the ambient. The cavity between the double walls may contain insulation. Seals which maintain the inner and outer pipes in concentric relationship are designed to relieve the axial compressive stress on the inner pipe (resulting from thermal expansion relative to the outer pipe) by being stressed beyond their yield points.

4 Claims, 2 Drawing Figures

DOUBLE-WALLED WELL CASING STRUCTURE

This is a continuation of application Ser. No. 544,517, filed Jan. 27, 1975 now abandoned, which in turn is a continuation of application Ser. No. 268,377, filed July 3, 1972 now abandoned.

BACKGROUND OF THE INVENTION

This invention relates generally to well casings, and more particularly to insulated well casings.

In considering the environment to which an oil well casing would be exposed in the Prudhoe Bay area of Alaska, certain new requirements were developed. In this vicinity there exists a layer of permafrost; i.e., a layer of subsurface soil which may extend down 2,000 feet and is permanently frozen. If a well is drilled utilizing the same approach followed in temperate climates the oil (which is approximately 180° F.) passing through the well casing will cause the permafrost about the well casing to melt. The melting of the permafrost causes it to subside, exerting downward drag on the well casing which may cause failure. Moreover, if the flow of oil is terminated, the soil surrounding the casing will eventually refreeze which may produce forces sufficient to cause the casing to collapse.

Even in temperate climates a fluid may become excessively viscous as it flows to the surface if its natural heat is not retained sufficiently.

SUMMARY OF THE INVENTION

In a preferred form of the invention, the innner and outer pipes of a double-walled well casing pipe section are maintained in concentric relation by seals at both ends which also hermetically seal the cavity between the two pipes. The well casing is designed to contain a fluid which is hotter than the ambient medium. The inner pipe consequently elongates relative to the outer pipe causing a deflection of the seals. The metal seal is so sized that the deflection will stress it beyond its yield point.

DESCRIPTION OF THE PREFERRED EMBODIMENT

Figure 1:
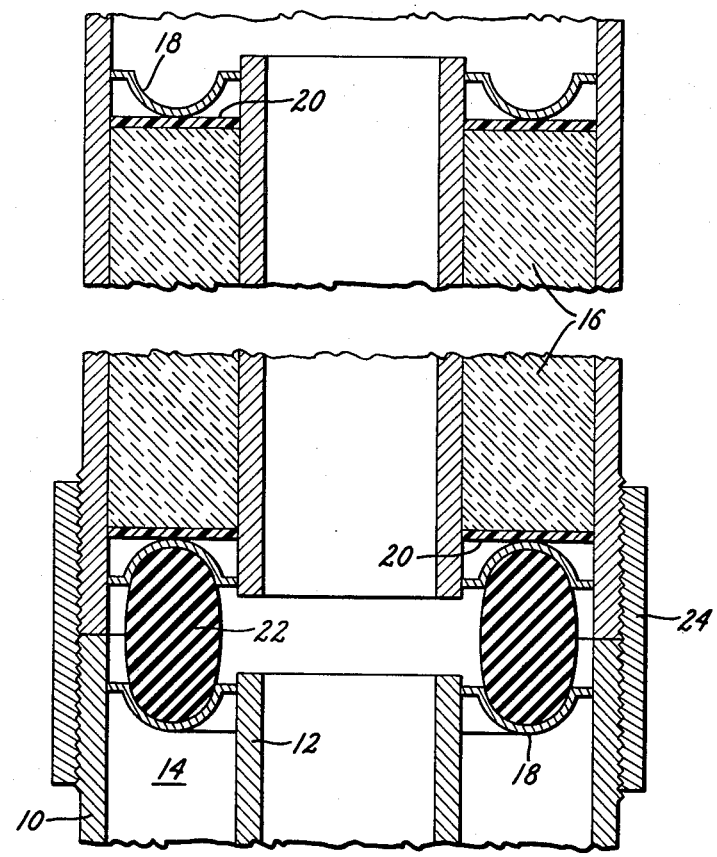
FIG. 1 is a cross-section of one embodiment of the double-walled well casing of this invention.

Referring to FIG. 1, a double-walled well casing structure is illustrated. Outer pipe 10 and inner pipe 12 are concentrically arranged thereby forming cavity 14 between them. Cavity 14 may be evacuated or may contain some heat insulation 16. A suitable insulation for some purpose is disclosed in U.S. Patent Application Ser. No. 167,252 filed July 29, 1971 now U.S. Pat. No. 3,780,376.

Cavity 14 is hermetically sealed by a seal 18 at both ends of each pipe section. Seal 18 is fabricated of metal and also serves to maintain the concentric spacing of outer and inner pies 10 and 12. Seal 18 may be joined to pipes 10 and 12 by welding, and heat insulating annular disc 20 may be used to prevent damage to heat insulation 16 due to the heat of welding.

As shown, seal 18 has a concave configuration (when viewed from the outside of a completed pipe section). This configuration provides a long heat path of low conductivity between the inner and outer pipes, a suitable profile to withstand internal pipe pressure, accommodates differential movement between the inner and outer pipes, and provides a receptacle for flexible annular ring 22. Ring 22 may be of rubber or soft plastic and prevents the hot fluid which will flow through inner pipe 12 from circulating in the annular cavities bounded by seals 18, and the outer and inner pipes 10 and 12 at each coupling. Coupling 24 may be any of the standard couplings used in forming a well string or an integral connection may be utilized.

The well casing structure of this invention is designed for use in a working environment where inner pipe 12 is carrying a fluid which is hotter than the soil, rock, etc., which surrounds outer pipe 10. In a test of the well casing structure, for example, oil at 180° F. flowed through inner pipe 12, while outer pipe 10 was exposed to a temperature of 20° F. As shown, in FIG. 1, inner pipe 12 is somewhat shorter than outer pipe 10. This is to accommodate the differential thermal expansion which will occur when the well casing is in its working environment. The amount of differential thermal expansion which will result can be calculated using well-known formulas.

Figure 2:
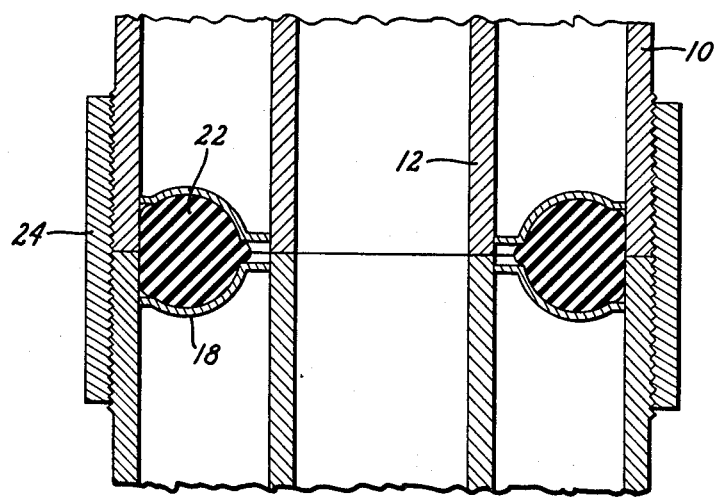
FIG. 2 is a cross-section of a portion of FIG. 1 under differential thermal expansion.

Referring to FIG. 2, a joint between two pipe sections is shown in the working environment. Outer pipe 10 and inner pipe 12 are now about the same length. Flexible ring 22 has been deformed, but still serves to prevent hot fluid from inner pipe 12 circulating against outer pipe 10.

Seals 18 have been deflected from their original position to the new position shown. In accordance with the invention, contrary to normal engineering practice wherein structural members are stressed below the elastic limit, seals 18 are designed so that this deflection will stress the seals beyond their yield point. Annealing the seals prior to their installation minimizes structural fatigue effects. If seals 18 were to remain within the elastic limit they would exert axial compressive stress on inner pipe 12 which would tend to buckle the inner pipe. In the present invention, however, this stress is relieved.

In one embodiment fabricated in accordance with the invention, the outer pipe was American Petroleum Institute N-80 grade steel having an outer diameter of 9¾ inches, while the inner pipe was American Petroleum Institute C-75 grade steel having a 5½ inch outer diameter. The outer pipe was 40 feet long. A differential thermal expansion of approximately one half inch resulted from a temperature difference of about 160 Fahrenheit degrees. The end seal was made from 304 stainless steel, 0.125 thick, by machining to 0.040 and then stretch forming to a minimum of 0.027 inches in the curved portions.

While a particular embodiment of a double-walled well casing structure has been shown and described, it will be obvious that changes and modifications can be made without departing from the spirit of the invention and the scope of the appended claims.

What is claimed is:

1. A double-walled well casing structure for use in a working environment where the casing will carry a fluid which is hotter than the ambient temperature comprising:
   concentric inner and outer pipe sections;
   seal means at both ends of each pipe section sealing the cavity between said inner and outer pipes and supporting said pipes relative to each other; and said seal means constructed of metal and sized so that it will be stressed beyond its yield point by the differential thermal expansion of the inner and outer pipes relative to each other when in their working environment.

2. A double-walled well casing in accordance with claim 1 wherein:
said seal means has a concave configuration.

3. A double-walled well casing in accordance with claim 1 wherein:
said cavity between said inner and outer pipes contains a heat insulating material.

4. A double-walled well casing in accordance with claim 1 further including:
a flexible annular ring;
said seal means having a concave configuration for receiving, together with the adjoining pipe section, said flexible annular ring; and
coupling means for joining pipe sections together.

* * * * *